(12) United States Patent
Sines et al.

(10) Patent No.: US 9,118,928 B2
(45) Date of Patent: Aug. 25, 2015

(54) METHOD AND SYSTEM FOR PROVIDING SINGLE VIEW VIDEO SIGNAL BASED ON A MULTIVIEW VIDEO CODING (MVC) SIGNAL STREAM

(75) Inventors: Gabor Sines, Toronto (CA); Pavel Siniavine, Richmond Hill (CA); Jitesh Arora, Markham (CA); Alexander Zorin, Aurora (CA); Xingping Cao, Markham (CA); Mohamed Cherif, Thornhill (CA); Edward Callway, Toronto (CA)

(73) Assignee: ATI Technologies ULC, Markham (CA)

( * ) Notice: Subject to any disclaimer, the term of this patent is extended or adjusted under 35 U.S.C. 154(b) by 941 days.

(21) Appl. No.: 13/040,830

(22) Filed: Mar. 4, 2011

(65) Prior Publication Data

US 2012/0224642 A1 Sep. 6, 2012

(51) Int. Cl.
*H04N 19/597* (2014.01)
*H04N 7/50* (2006.01)
*H04N 101/00* (2006.01)

(52) U.S. Cl.
CPC .......... *H04N 19/597* (2014.11); *H04N 2101/00* (2013.01); *H04N 2201/00* (2013.01)

(58) Field of Classification Search
CPC .............. H04N 19/00769; H04N 1/00; H04N 2005/00; H04N 2101/00; H04N 2201/00; H04N 2213/00
USPC ......... 348/48, 43, 51, 42, 45, 46, 47, 49, 409, 348/402, 407, 415, 412, 416; 375/240.01–240.26

See application file for complete search history.

(56) References Cited

U.S. PATENT DOCUMENTS

| | | | |
|---|---|---|---|
| 6,055,012 A * | 4/2000 | Haskell et al. | 348/48 |
| 2011/0194619 A1* | 8/2011 | Yu | 375/240.26 |
| 2011/0216838 A1* | 9/2011 | Lin et al. | 375/240.25 |
| 2011/0222605 A1* | 9/2011 | Kashiwagi et al. | 375/240.16 |
| 2011/0242291 A1* | 10/2011 | Kato | 348/51 |
| 2011/0280318 A1* | 11/2011 | Yado et al. | 375/240.25 |
| 2012/0033037 A1* | 2/2012 | Chen et al. | 348/43 |
| 2012/0069903 A1* | 3/2012 | Lim et al. | 375/240.12 |
| 2012/0229602 A1* | 9/2012 | Chen et al. | 348/43 |
| 2012/0269275 A1* | 10/2012 | Hannuksela | 375/240.25 |
| 2012/0314965 A1* | 12/2012 | Kashiwagi et al. | 382/232 |
| 2013/0222539 A1* | 8/2013 | Pahalawatta et al. | 348/43 |

* cited by examiner

*Primary Examiner* — Behrooz Senfi
(74) *Attorney, Agent, or Firm* — Faegre Baker Daniels LLP

(57) ABSTRACT

A method and system for producing a single view video signal based on a multiview video coding (MVC) signal stream. A MVC signal stream representing multiple spatially related views of a scene, including a base view and at least one dependent view, is decoded to provide multiple decoded video signals representing the spatially related views, with respective portions of the MVC signal stream representing one of multiple temporally adjacent video frames, and the MVC signal stream representing multiple sequences of spatially adjacent video frames. The decoded video signals are processed to provide a processed video signal representing one of the spatially related views using image information from more than one of the decoded video signals. As a result, more image data is used during processing, thereby improving the spatial and temporal image quality.

18 Claims, 4 Drawing Sheets

METHOD AND SYSTEM FOR PROVIDING SINGLE VIEW VIDEO SIGNAL BASED ON A MULTIVIEW VIDEO CODING (MVC) SIGNAL STREAM

FIELD OF THE DISCLOSURE

The present disclosure relates to processing of multiview video coding (MVC) signals, and in particular, to processing of MVC signals for use in single-view displays.

BACKGROUND OF THE DISCLOSURE

With recent successes of three-dimensional (3D) feature length films, 3D video services are expected to soar in popularity in the entertainment and communication industries, and further, in the consumer electronics industry as more devices are designed to capture, produce, communicate, display and store such image information. For example, one application is that of conventional television using displays capable of rendering 3D imaging, e.g., as a stereoscopic image, where the display renders two views, one for each eye, so that the images are perceived as 3D. Even more sophisticated displays will be able to produce and display multiple views in such a way that the 3D image perceived by the viewer depends upon the location of the viewer with respect to the display device. As a result, a widely used video coding standard, identified as the H.264/AVC standard, has been extended to include multiview video coding (MVC).

Referring to FIG. 1, multiview video sequences are captured by multiple image capturing devices 12, 14, 16 positioned in different locations and capturing images of the subjects A, B from different angles, e.g., as each subject moves within the 3D space (along axes X, Y and Z), each with its own field of view 12a, 14a, 16a, to produce corresponding single view video signals 13, 15, 17. (As will be readily appreciated, each of these video signals 13, 15, 17 can include multiple signals. For example, each may include multiple color specific signals, such as red, green and blue, or as is more common, a luminance component signal Y, a blue difference chrominance component signal Cb and a red difference chroma component signal Cr.) Accordingly, the captured images are different representations of the same objects A, B. As a result, there is some redundancy with respect to some of the captured image information, but also complementary image information due to the different viewing angles.

Referring to FIG. 2, the multiview video signals 13, 15, 17 are encoded by a MVC encoder 18 to produce a MVC signal stream 20. Such encoders are well known in the art and can be implemented using various combinations of hardware (e.g., one or more microprocessors or other suitable processors), firmware and software.

Referring to FIG. 3, in accordance with the MVC signal standard, the imaging capturing devices (e.g., digital video cameras) 12, 14, 16 produce their signals 13, 15, 17 containing bitstreams 20, portions 22 of which represent temporally adjacent video frames, and, as between the respective signals 13, 15, 17 from the image capturing devices, 12, 14, 16, represent spatially adjacent video frames.

However, notwithstanding the anticipated popularity of 3D video applications, the fact is that many single view, e.g., two-dimensional (2D) imaging applications and display devices remain in use and are expected to continue in use for some time. Currently, the MVC standard provides backward compatibility such that a compliant decoder decodes a single view and discards the remaining data, while a compliant MVC decoder decodes all views to generate the multiview, e.g., 3D video image. It would be desirable to enhance the compatibility with single view image devices.

DETAILED DESCRIPTION OF PREFERRED EMBODIMENTS

Figure 1:
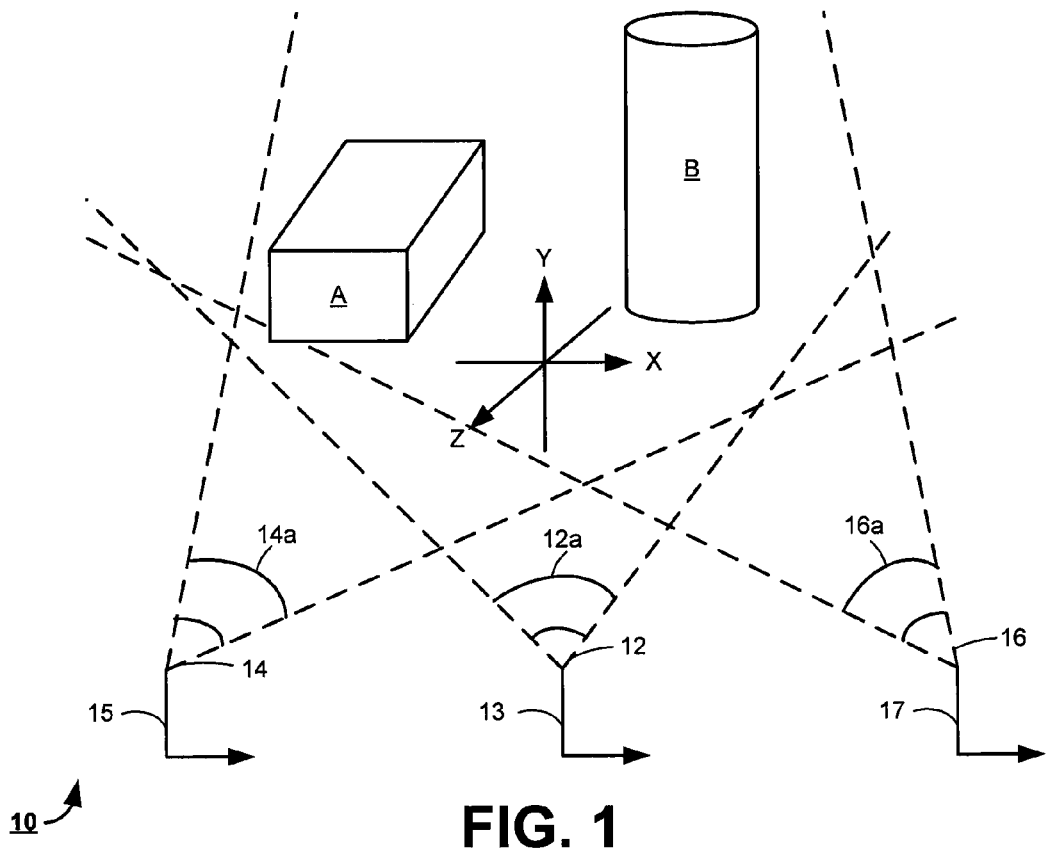
FIG. 1 is a conceptual view of a conventional technique for capturing multiview video sequences.
Figure 3:
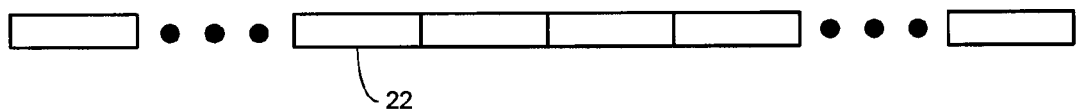
FIG. 3 depicts an exemplary bitstream generated by a digital video imaging capturing device.
Figure 2:
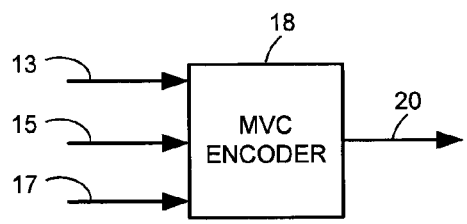
FIG. 2 depicts conventional encoding of multiview video signals to a MVC signal stream.

The following detailed description is of example embodiments with references to the accompanying drawings. Such description is intended to be illustrative and not limiting with respect to the scope of the possible embodiments. Such embodiments are described in sufficient detail to enable one of ordinary skill in the art to practice them, and it will be understood that other embodiments may be practiced with some variations.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

Advantageously, embodiments of the invention, which include but are not limited to a method and system, allow for more complete use of the image information available from each of the multiple views in a MVC signal stream. By using more of the temporal or spatial, or both, image information (than is available in a single signal stream) for a single view image, improved image resolution and smoothing, particularly during image movement, can be achieved for the resulting single view image. Additionally, improved transcode quality can be achieved when converting from a MVC signal to a single view signal with a codec.

In accordance with exemplary embodiments, a method and system are provided for producing a single view video signal based on a multiview video coding (MVC) signal stream. A MVC signal stream representing multiple spatially related views of a scene, including a base view and at least one dependent view, is decoded to provide multiple decoded video signals representing the spatially related views, with respective portions of the MVC signal stream representing one of multiple temporally adjacent video frames, and the MVC signal stream representing multiple sequences of spatially adjacent video frames. The decoded video signals are processed to provide a processed video signal representing one of the spatially related views using image information from more than one of the decoded video signals. As a result, more image data is used during processing, thereby improving the spatial and temporal image quality.

In accordance with an exemplary embodiment, a method of providing a single view video signal based on a multiview video coding (MVC) signal stream includes:

decoding a MVC signal stream representing a plurality of spatially related views of a scene, including a base view and at least one dependent view, to provide a plurality of decoded video signals representing the plurality of spatially related views; and processing the plurality of decoded video signals using image information from more than one of the plurality of decoded video signals to provide a processed video signal representing one of the plurality of spatially related views.

In accordance with another exemplary embodiment, a video system for providing a single view video signal based on a multiview video coding (MVC) signal stream includes:

a decoder adapted to decode a MVC signal stream representing a plurality of spatially related views of a scene, including a base view and at least one dependent view, to provide a plurality of decoded video signals representing the plurality of spatially related views; and one or more video processors adapted to process the plurality of decoded video signals using image information from more than one of the plurality of decoded video signals to provide a processed video signal representing one of the plurality of spatially related views.

In accordance with another exemplary embodiment, a computer readable medium including a plurality of executable instructions that, when executed by an integrated circuit design system, cause the integrated circuit design system to produce at least one integrated circuit (IC) for providing a single view video signal based on a multiview video coding (MVC) signal stream and including:

a decoder adapted to decode a MVC signal stream representing a plurality of spatially related views of a scene, including a base view and at least one dependent view, to provide a plurality of decoded video signals representing the plurality of spatially related views; and one or more video processors adapted to process the plurality of decoded video signals using image information from more than one of the plurality of decoded video signals to provide a processed video signal representing one of the plurality of spatially related views.

Figure 4:
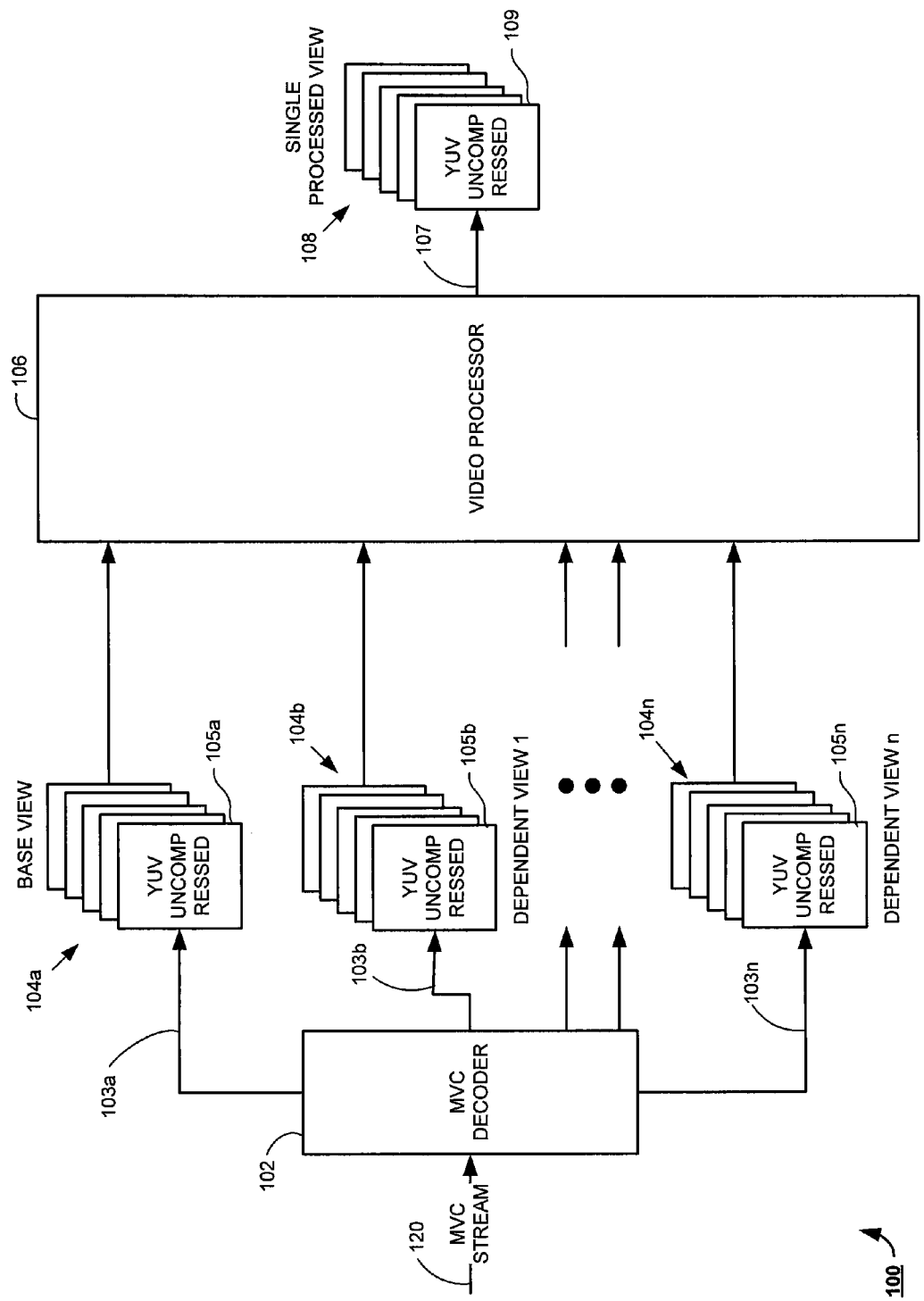
FIG. 4 is a functional block diagram of a system for providing a single view video signal based on a MVC signal stream in accordance with an exemplary embodiment.

Referring to FIG. 4, a system 100 in accordance with one exemplary embodiment includes a MVC decoder 102 and a video processor 106, interconnected substantially as shown. The MVC decoder 102 is well known in the art, e.g., implemented in accordance with the H.264/AVC standard, and can be implemented using various combinations of processing hardware (e.g., one or more microprocessors or other suitable processors), firmware and software. The incoming MVC signal stream 120 is decoded to produce a signal 103a representing the base view, plus additional signals 103b, . . . , 103n representing respective dependent views. The base view 104a includes a sequence of tenporally adjacent view frames 105a (or fields). Similarly, the dependent views 104b, . . . , 104n include respective sequences of tenporally adjacent video frames 105b, . . . , 105n. Further, as will be readily appreciated, due to the location of the image capturing devices, e.g., similar to the positioning of the image capture devices 12, 14, 16 in FIG. 1, the base 104a and dependent 104b, . . . , 104n views are mutually spatially adjacent. For example, using the arrangement of FIG. 1, if the central image capturing device 12 captures the base view 104a, an adjacent image capturing device 14 captures a dependent view 104b which is spatially adjacent the base view 104a captured by the center image capturing device 12, i.e., due to their overlapping fields of view 12a, 14a.

These decoded signals 103a, 103b, . . . , 103n are processed by the video processor 106 (discussed in more detail below) to produce a video signal 107 representing a single view 108 containing tenporally adjacent video frames 109. Each of these frames 109 is based primarily on the corresponding video frame 105a of the base view 104a, but also includes image information from one or more temporal or spatial, or both, video frames 105b, . . . , 105n from one or more neighboring dependent views 104b, . . . , 104n.

Figure 5:
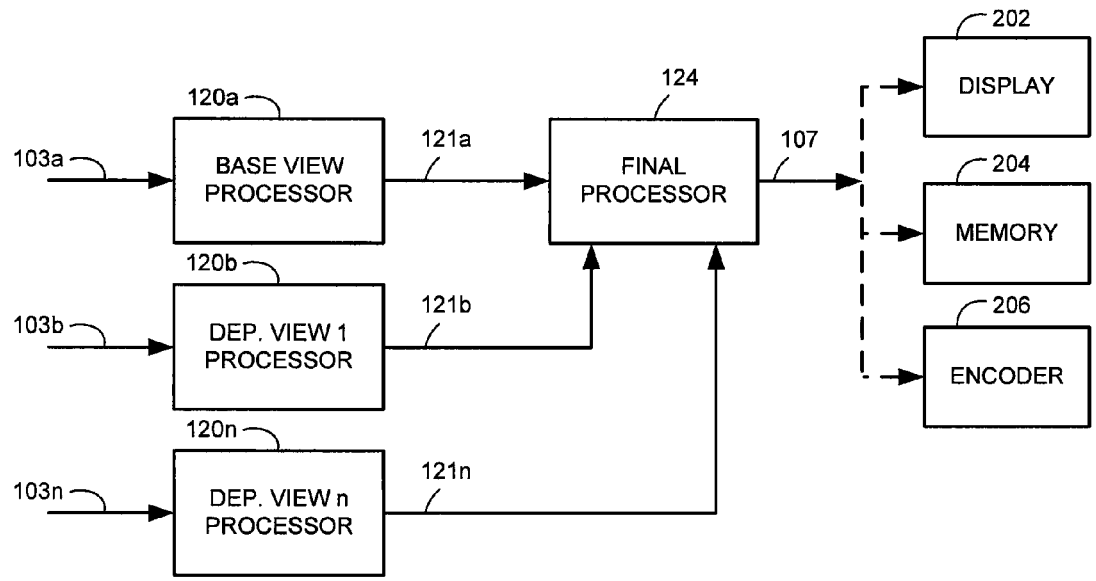
FIG. 5 is a functional block diagram of an exemplary embodiment of the video processor of FIG. 4.

Referring to FIG. 5, an exemplary embodiment 106a of the video processor 106 of FIG. 4 includes a base view processor 120a, dependent view processors 120b, . . . , 120n, and a final view processor 124, interconnected substantially as shown. As discussed in more detail below, the base view processor 120a processes the base view signal 103a while the dependent view processors 120b, . . . , 120n process their respective dependent view signals 103b, . . . , 103n. Such processors 120a, 120b, . . . , 120n can be implemented using various combinations of hardware (e.g., one or more microprocessors or other suitable processors), firmware and software in accordance with well known techniques. Each processor 120a, 120b, . . . , 120n analyzes the image data in its respective decoded signal 103a, 103b, . . . , 103n to collect and provide spatial and temporal data 121a, 121b, . . . , 121n. The final view processor 124 combines and uses this data 121a, 121b, . . . , 121n to produce the single view signal 107. This single view signal 107 can be sent to a display 202 for immediate video playback, stored in memory 204 for later use, encoded by another encoder 206 prior to transmission elsewhere for other uses, or passed onto another application for further processing.

Figure 6:
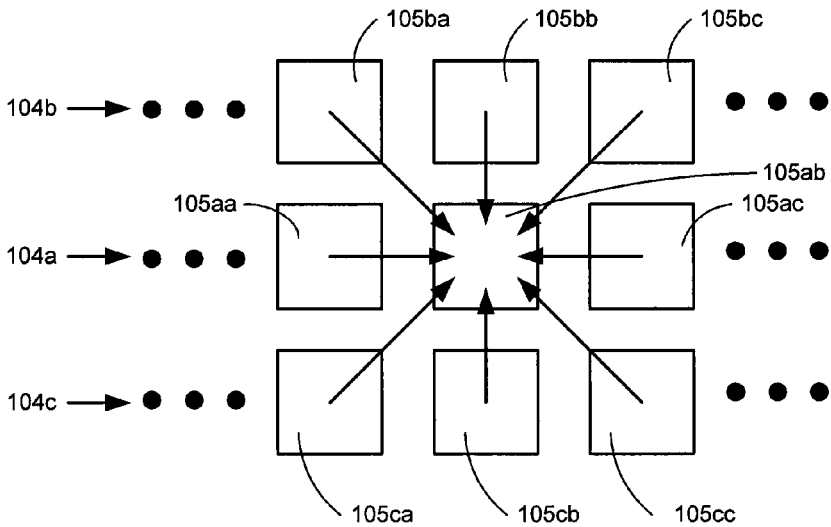
FIG. 6 depicts the use of temporally and spatially adjacent image information from dependent views for processing the base view in accordance with an exemplary embodiment.

Referring the FIG. 6, use of temporal and spatial image information for processing the single view signal 107 can be visualized as shown. For example, as discussed above, the base view 104a includes a sequence of tenporally adjacent video frames 105a, including intermediate frames 105aa, 105ab, 105ac. Similarly, spatially adjacent dependent views 104b, 104c include respective sequences of tenporally adjacent video frames 104b, 104c, including intermediate frames 105ba, 105bb, 105bc, 105ca, 105cb, 105cc. As depicted here, such dependent views, 104b, 104c have video frames 105b, 105c, that are spatially adjacent to corresponding video frames 105*a* of the base view 104*a*. For example, the central intermediate frame 105*ab* of the base view 104*a* corresponds to spatially adjacent central intermediate frames 105*bb*, 105*cb* of its spatially adjacent dependent views 104*b*, 104*c*. Accordingly, in accordance with an exemplary embodiment, when the final view processor 124 (FIG. 5) is processing this central intermediate video frame 105*ab*, it can use image information from the corresponding frames 105*bb*, 105*cb* of the adjacent dependent views 104*b*, 104*c*. Additionally, such processor 120*a* can also use image information from the tenporally adjacent video frames 105*ba*, 105*bc*, 105*ca*, 105*cc* of the dependent views 104*b*, 104*c*. Further, such processor 120*a* can also use image information from tenporally adjacent video frames 105*aa*, 105*ac* within the base view itself, e.g., as part of an interpolation process.

Figure 7:
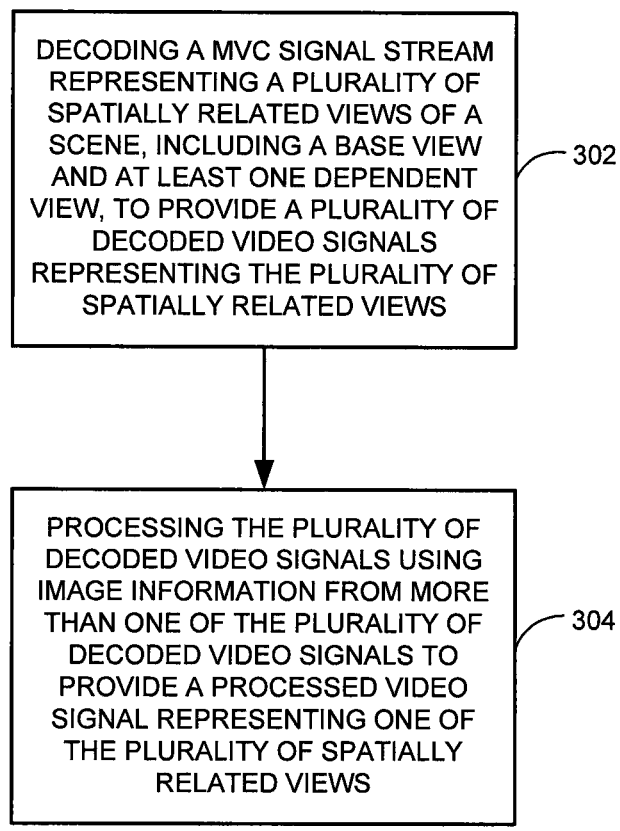
FIG. 7 is a flowchart of an exemplary embodiment of a method of providing a single view video signal based on a MVC signal stream.

Referring to FIG. 7, an exemplary embodiment of a method 300 of providing a single view video signal based on a MVC signal stream begins by decoding 302 a MVC signal stream representing a plurality of spatially related views of a scene, including a base view and at least one dependent view, to provide a plurality of decoded video signals representing the plurality of spatially related views. Following this is processing 304 the plurality of decoded video signals using image information from more than one of the plurality of decoded video signals to provide a processed video signal representing one of the plurality of spatially related views.

As discussed hereinabove, the processors 120*a*, 120*b*, . . . , 120*n* (FIG. 5) can be implemented using various combinations of hardware (e.g., one or more microprocessors or other suitable processors), firmware and software. Such hardware portions are generally designed by integrated circuit design systems (e.g., work stations with digital processors) that create integrated circuits based on executable instructions stored on a computer readable medium including memory (e.g., CDROM, RAM, other forms of ROM, hard drives, distributed memory, or any other suitable computer readable medium). The instructions may be represented by any suitable language such as but not limited to hardware descriptor language (HDL) or other suitable language. The computer readable medium contains the executable instructions that when executed by the integrated circuit design system causes the integrated circuit design system to produce an integrated circuit that includes the devices or circuitry as set forth above. The code is executed by one or more processing devices in a work station or system (not shown). As such, the devices or circuits described herein may also be produced as integrated circuits by such integrated circuit design systems executing such instructions.

Although the invention has been described in connection with specific preferred embodiments, it should be understood that the invention as claimed should not be unduly limited to such specific embodiments as other modifications and alternations in the method and structure of this invention will be apparent to those skilled in the art without departing from the scope and the spirit of the invention. It is intended that the following claims define the scope of the present invention and that methods and structures within the scope of these claims and their equivalents be covered thereby.

What is claimed is:

1. A method, carried out by a video system for providing a single view video signal based on a multiview video coding (MVC) signal stream, comprising:
    processing a MVC signal stream using image information from more than one of a plurality of decoded video signals that represent a plurality of spatially related views; and
    providing a processed video signal representing one of said plurality of spatially related views based on said processing said MVC signal stream using said image information from said more than one of said plurality of decoded video signals that represent said plurality of spatially related views.

2. The method of claim 1, wherein:
said MVC signal stream includes a bitstream corresponding to a base view and at least another bitstream corresponding to at least one dependent view; and
said processing a MVC signal stream comprises
    decoding said bitstream corresponding to said base view to provide one of said plurality of decoded video signals, and
    decoding said bitstream corresponding to said at least one dependent view to provide at least another one of said plurality of decoded video signals.

3. The method of claim 1, wherein:
said MVC signal stream includes a bitstream of which a first portion corresponds to a base view and of which at least a second portion corresponds to at least one dependent view; and
said processing a MVC signal stream comprises
    decoding said first portion of said bitstream to provide one of said plurality of decoded video signals, and
    decoding said at least a second portion of said bitstream to provide at least another one of said plurality of decoded video signals.

4. The method of claim 1, wherein:
respective portions of said MVC signal stream include respective temporal image information corresponding to one of a plurality of temporally adjacent video frames;
respective portions of said MVC signal stream include respective spatial image information corresponding to one of a plurality of sequences of spatially adjacent video frames; and
said processing said MVC signal stream comprises processing said plurality of decoded video signals using at least one of said temporal and spatial image information.

5. The method of claim 4, wherein said processing said MVC signal stream comprises:
processing at least one of said plurality of decoded video signals representing at least one dependent view to provide said at least one of said temporal and spatial image information related to said at least one dependent view; and
processing another one of said plurality of decoded video signals representing a base view using said at least one of said temporal and spatial image information related to said at least one dependent view to provide said processed video signal representing said base view.

6. The method of claim 1, wherein said processing said MVC signal stream comprises:
processing at least one of said plurality of decoded video signals representing at least one dependent view to provide image information related to said at least one dependent view; and
processing another one of said plurality of decoded video signals representing a base view using said image information related to said at least one dependent view to provide said processed video signal representing said base view.

7. An apparatus including a video system for providing a single view video signal based on a multiview video coding (MVC) signal stream, comprising:
a decoder adapted to decode a MVC signal stream representing a plurality of spatially related views of a scene, including a base view and at least one dependent view, to provide a plurality of decoded video signals representing said plurality of spatially related views; and one or more video processors adapted to process said plurality of decoded video signals using image information from more than one of said plurality of decoded video signals to provide a processed video signal representing one of said plurality of spatially related views using said image information from said more than one of said plurality of decoded video signals that represent said plurality of spatially related views.

8. The apparatus of claim 7, wherein:
said MVC signal stream includes a bitstream corresponding to said base view and at least another bitstream corresponding to said at least one dependent view; and
said decoder is adapted to
   decode said bitstream corresponding to said base view to provide one of said plurality of decoded video signals, and
   decode said bitstream corresponding to said at least one dependent view to provide at least another one of said plurality of decoded video signals.

9. The apparatus of claim 7, wherein:
said MVC signal stream includes a bitstream of which a first portion corresponds to said base view and of which at least a second portion corresponds to said at least one dependent view; and
said decoder is adapted to
   decode said first portion of said bitstream to provide one of said plurality of decoded video signals, and
   decode said at least a second portion of said bitstream to provide at least another one of said plurality of decoded video signals.

10. The apparatus of claim 7, wherein:
respective portions of said MVC signal stream include respective temporal image information corresponding to one of a plurality of temporally adjacent video frames;
respective portions of said MVC signal stream include respective spatial image information corresponding to one of a plurality of sequences of spatially adjacent video frames; and
said one or more video processors are adapted to process said plurality of decoded video signals using at least one of said temporal and spatial image information.

11. The apparatus of claim 10, wherein said one or more video processors are adapted to:
process at least one of said plurality of decoded video signals representing said at least one dependent view to provide said at least one of said temporal and spatial image information related to said at least one dependent view; and
process another one of said plurality of decoded video signals representing said base view using said at least one of said temporal and spatial image information related to said at least one dependent view to provide said processed video signal representing said base view.

12. The apparatus of claim 7, wherein said one or more video processors are adapted to:
process at least one of said plurality of decoded video signals representing said at least one dependent view to provide image information related to said at least one dependent view; and
process another one of said plurality of decoded video signals representing said base view using said image information related to said at least one dependent view to provide said processed video signal representing said base view.

13. A non-transitory computer readable medium comprising a plurality of executable instructions that, when executed by an integrated circuit design system, cause the integrated circuit design system to produce at least one integrated circuit (IC) for providing a single view video signal based on a multiview video coding (MVC) signal stream and including:
a decoder adapted to decode a MVC signal stream representing a plurality of spatially related views of a scene, including a base view and at least one dependent view, to provide a plurality of decoded video signals representing said plurality of spatially related views; and
one or more video processors adapted to process said plurality of decoded video signals using image information from more than one of said plurality of decoded video signals to provide a processed video signal representing one of said plurality of spatially related views using said image information from said more than one of said plurality of decoded video signals that represent said plurality of spatially related views.

14. The non-transitory computer readable medium of claim 13, wherein:
said MVC signal stream includes a bitstream corresponding to said base view and at least another bitstream corresponding to said at least one dependent view; and
said decoder is adapted to
   decode said bitstream corresponding to said base view to provide one of said plurality of decoded video signals, and
   decode said bitstream corresponding to said at least one dependent view to provide at least another one of said plurality of decoded video signals.

15. The non-transitory computer readable medium of claim 13, wherein:
said MVC signal stream includes a bitstream of which a first portion corresponds to said base view and of which at least a second portion corresponds to said at least one dependent view; and
said decoder is adapted to
   decode said first portion of said bitstream to provide one of said plurality of decoded video signals, and
   decode said at least a second portion of said bitstream to provide at least another one of said plurality of decoded video signals.

16. The non-transitory computer readable medium of claim 13, wherein:
respective portions of said MVC signal stream include respective temporal image information corresponding to one of a plurality of temporally adjacent video frames;
respective portions of said MVC signal stream include respective spatial image information corresponding to one of a plurality of sequences of spatially adjacent video frames; and
said one or more video processors are adapted to process said plurality of decoded video signals using at least one of said temporal and spatial image information.

17. The non-transitory computer readable medium of claim 16, wherein said one or more video processors are adapted to:
process at least one of said plurality of decoded video signals representing said at least one dependent view to provide said at least one of said temporal and spatial image information related to said at least one dependent view; and
process another one of said plurality of decoded video signals representing said base view using said at least one of said temporal and spatial image information related to said at least one dependent view to provide said processed video signal representing said base view.

18. The non-transitory computer readable medium of claim 13, wherein said one or more video processors are adapted to:
  process at least one of said plurality of decoded video signals representing said at least one dependent view to provide image information related to said at least one dependent view; and
  process another one of said plurality of decoded video signals representing said base view using said image information related to said at least one dependent view to provide said processed video signal representing said base view.

\* \* \* \* \*